United States Patent [19]

Olsen

[11] Patent Number: 5,518,839

[45] Date of Patent: May 21, 1996

[54] CURRENT COLLECTOR FOR SOLID ELECTROCHEMICAL CELL

[76] Inventor: Ib I. Olsen, 1800 Green Valley Park Way, #223, Henderson, Nev. 89014

[21] Appl. No.: 422,181

[22] Filed: Apr. 12, 1995

[51] Int. Cl.$^6$ ............................. H01M 4/66; H01M 6/18
[52] U.S. Cl. ........................ 429/192; 429/233; 429/245
[58] Field of Search ................................. 429/192, 245, 429/233

[56] References Cited

U.S. PATENT DOCUMENTS 4,960,655  10/1990  Hope et al. ..................... 429/245 X
5,262,254  11/1993  Koksbang et al. ................... 429/192

*Primary Examiner*—John S. Maples

[57] ABSTRACT

A solid state electrochemical cell comprising:
(i) an anode;
(ii) a cathode;
(iii) interposed between the anode and cathode, a polymeric electrolyte; and
(iv) adjacent to either the anode or the cathode, on a side opposite to the polymeric electrolyte, a current collector comprising (a) etched aluminum foil and (b) on a side of the etched aluminum foil facing the cathode or the anode, a layer of a metal which is more resistant to corrosion from components in the electrochemical cell than aluminum in an amount effective to inhibit corrosion between the cathode or anode and the etched aluminum foil.

19 Claims, No Drawings

CURRENT COLLECTOR FOR SOLID ELECTROCHEMICAL CELL

BACKGROUND OF THE INVENTION

1. Field of the Invention

This invention relates to solid electrochemical (electrolytic) cells and, more particularly, to nickel-coated aluminum current collectors for solid electrochemical cells in which the electrolyte is a polymeric network interpenetrated by an ionically conducting liquid.

2. State of the Art

Electrochemical cells containing an anode, a cathode and a solid, solvent-containing electrolyte are known in the art and are usually referred to as "solid batteries." See, for instance, U.S. Pat. Nos. 5,229,225, 5,238,758, 5,358,801, and 5,366,829. These cells offer a number of advantages over electrochemical cells containing a liquid electrolyte (i.e., "liquid batteries") including improved safety features.

In a typical solid electrochemical cell, a current collector is provided as a support for the cathode. For example, the cathode, which is often prepared in the form of a paste, may be spread onto the current collector and then cured by conventional methods to provide for a solid positive cathodic plate. The cathode (excluding the support) generally has a thickness of between about 20 and 150 μm. Current collectors themselves are well known in the art and are commercially available. Generally, the art to date has employed current collectors for cathodes which are made of roughened nickel (electrolytically deposited nickel) on a nickel current collector. The current collectors are preferably attached to the surface of the cathode not facing the electrolyte but can also be attached to the anode. When the current collector is attached to the cathode, the cathode is interposed between the electrolyte and the current collector.

Current collectors such as nickel have been found to be highly effective in minimizing corrosion in the battery environment. However, while effective in function, nickel current collectors give rise to at least two significant drawbacks. First, nickel is a relatively expensive metal and thus, its use as a current collector appreciably adds to the cost of a solid electrochemical cell. Second, nickel is a relatively heavy metal. Indeed, nickel current collectors employed at the present time in solid electrochemical cells can take up half the weight of the ultimate laminate. This, of course, significantly reduces the energy density available per weight of the cell.

In an attempt to overcome the significant drawbacks associated with nickel current collectors, aluminum has been used to fabricate current collectors. Aluminum is attractive in view of its low cost and low density, which are the problems which have been encountered with nickel. Nonetheless, aluminum has not proven itself to be a completely suitable substitute because it has been found to corrode over time in the battery environment.

SUMMARY OF THE INVENTION

This invention achieves a suitable combination of these desired properties by providing a current collector in a solid electrochemical cell which comprises a layer of etched aluminum foil provided with a thin coating of a metal which is more resistant to corrosion from components in the electrochemical cell than aluminum, such as nickel.

Thus, this invention provides, in a first aspect, a solid electrochemical cell comprising:

(i) an anode;

(ii) a cathode;

(iii) interposed between the anode and cathode, a polymeric electrolyte; and (iv) adjacent to either the anode or the cathode, on a side opposite to the polymeric electrolyte, a current collector comprising (a) etched aluminum foil and (b) on a side of the etched aluminum foil facing the cathode or the anode, a layer of a metal which is more resistant to corrosion from components in the electrochemical cell than aluminum in an amount effective to inhibit corrosion between the cathode or anode and the etched aluminum foil.

In a second aspect, this invention provides a method for inhibiting corrosion of an aluminum foil current collector during operation of a solid electrochemical cell comprising an anode, a cathode, and a polymeric electrolyte interposed between the anode and the cathode wherein the method comprises:

(a) etching the aluminum foil in an acidic aqueous solution having a pH of less than about 2; and (b) coating the etched aluminum foil described above on the side which will attach to the anode or the cathode with a layer of a metal which is more resistant to corrosion from components in the electrochemical cell than aluminum in an amount effective to inhibit corrosion between the cathode or the anode and the aluminum when the current collector is placed adjacent to either the anode or the cathode, on a side opposite to the polymeric electrolyte.

DETAILED DESCRIPTION OF PREFERRED EMBODIMENTS

The present invention, in providing an aluminum current collector coated with a layer of a metal which is more resistant to corrosion from components in the electrochemical cell than aluminum, achieves a combination of properties which heretofore was not achievable. In particular, in addition to providing a desired current collecting function and preventing corrosion of the cathode or anode by the rest of the electrochemical cell's components, the present invention provides such a metal layer without significantly adding to the weight or to the cost of the final product.

However, prior to describing this invention in further detail, the following terms will be defined.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical. Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine, ethylene oxide, epichlorohydrine, acryloyl-derivatized polyalkylene oxides (disclosed in U.S. Pat. No. 4,908,283, which is incorporated herein) urethane acrylate, vinyl sulfonate polyalkylene oxides (as disclosed in U.S. Pat. No. 5,262,253 and incorporated herein), acrylic acid, chloroacrylic acid, bromoacrylic acid, crotonic acid, propylene, ethylene and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et at., Proc. Int. Power Sources Syrup., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones. Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "compatible electrolyte solvent," or "electrolytic solvent," or in the context of components of the solid electrolyte, just "solvent," is a low molecular weight organic plasticizer added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as propylene carbonate, ethylene carbonate, gamma-butyrolactone, glyme, diglyme, triglyme, tetraglyme, dimethylsulfoxide, dioxolane, sulfolane, and the like. A particularly preferred solvent is disclosed in U.S. Pat. No. 5,262,253, which is incorporated herein.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $Li[N(SO_2CF_3)_2]$, $LiCF_3SO_3$, $LiPF_6$, $NaSCN$, and the like. The inorganic ion salt preferably contains at least one atom selected from the group consisting of Li, Na and K.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/parallel arrangement to provide the required operating voltage and current levels.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated manganese oxides, e.g., $LiMn_2O_4$, lithiated nickel oxides, e.g., $LiNiO_2$, and mixtures thereof.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like.

A preferred method of fabricating an electrochemical cell is described herein. In addition, methods for preparing solid electrochemical cells and batteries are described in the art, for example, in U.S. Pat. Nos. 5,300,373, 5,3 16,556, 5,346,385, 5,262,253 and U.S. patent application Ser. Nos. 07/918,509 filed Jul. 22, 1992; 08/049,212, filed Apr. 19, 1993, which are all incorporated herein in their entirety.

In one preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the an and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The following Example illustrates a method of how an electrolytic cell could be fabricated.

It will be appreciated by persons skilled in the art that, because the present invention utilizes a current collector which provides a certain degree of structural integrity to the final cell, the electrolyte often is not required to have the structural integrity of a free standing film. Accordingly, it is permissible and advantageous to use a higher quantity of the radiation inert liquid because greater conductivity can be achieved. For example it is advantageous to use about 70 to 80% of the radiation inert liquid.

As the current collector, the present invention employs a layer of etched aluminum which is coated with a layer of a metal which is more resistant to corrosion from components in the electrochemical cell than aluminum in an mount effective to inhibit corrosion of the aluminum in the environment of a solid electrochemical cell. Preferred in this regard is nickel which exhibits a very high corrosion resistance in the environment of an electrochemical cell. However, it will be appreciated that other metals such as copper, chromium and titanium (or mixtures thereof will also provide an improved electrochemical cell in that they, like nickel, are more resistant to corrosion than aluminum and thus will afford a certain degree of protection to the underlying aluminum layer. Indeed, any metal which is otherwise compatible with a current collector and which exhibits a higher resistance to corrosion than aluminum can suitably be used as a coating layer for an aluminum current collector in accordance with the present invention.

The amount of the metal applied to the underlying aluminum preferably should be sufficient to produce a metal layer having a thickness between about 0.5 μm and about 10 μm, preferably between about 0.5 μm and about 3 μm. The layer of aluminum itself should have a thickness ranging between about 1 and 100 μm, preferably between 10 and 50 μm. Above 50 μm, there is little additional functional benefit derived from the current collector and the energy density of the final electrochemical cell is reduced. Below about 1 μm, there is not obtained enough of a current collecting effect which results in an undesirably high resistance in the cell and too much energy loss.

Prior to providing the metal coating on the aluminum base of the current collector, the aluminum base is advantageously and preferably roughened using surface roughening techniques which are well known in the art. For example, the aluminum base may be roughened by an etching process using nitric acid. Alternatively, the aluminum base may be roughened by other known roughening techniques such as by mechanical roughening. The roughening is advantageous in that it provides better adhesion between the aluminum or metal layer and an electrode.

Before applying the metallic corrosion resistant layer onto the layer of aluminum, the aluminum surface is first pretreated in order to roughen the surface which enhances the ability of the aluminum surface to adhere the to-be-deposited metal layer. Preferably, prior to roughening the surface of the aluminum, the aluminum surface should first be degreased in accordance with techniques well known to persons skilled in the art such as employing an alkaline galvanic degreasing. In particular, an alkaline solution such as 2 to 10M KCN is contacted with the aluminum sheet while applying a current of between 5 and 15 mA/cm$^2$. After rinsing the de-greased aluminum sheet with water, the sheet is desirably stained with a 10 to 20% solution of an alkaline material such as NaOH in order to stabilize its surface.

Etching of the aluminum foil and preferably the degreased and stained aluminum foil can be accomplished by subjecting the foil to an aqueous acidic solution having a pH of less than about 2 and preferably having a pH of less than 1. Aluminum foil which has been etched by treated with an aqueous acidic solution or other equivalent methods are referred to as "etched aluminum foil". Such acid etching treatments are well known in the art and include treatments with strong nitric acid or strong sulfuric acid in order to remove the oxide layer from the aluminum which layer is known to be non-adherent. The etching conditions are well known in the art and include etching temperatures of from about 10° C. to about 40° C. and the contact of the aluminum foil with the aqueous acidic etching solution is maintained for a period sufficient to effect etching of the aluminum foil. In a preferred embodiment, contact is maintained for a period of from about 2 to about 15 minutes depending on the temperature and thickness of the oxide layer. The solution is preferably stirred.

After etching is complete, it is preferable to then treat the sheet with a stain such as zinc or magnesium in order to form a zinc or magnesium monolayer. Such known staining techniques enhance the adhesion of the metallic corrosion resistant layer to the underlying aluminum substrate. Preferably, the zinc or magnesium stain forms a layer of zinc or magnesium atoms of from a monolayer to about 100 Å in depth.

The metallic corrosion resistant layer is next applied to the etched aluminum base which optionally has been subjected to other pretreatments as described above. In a preferred embodiment, the metallic corrosion resistant layer is plated onto the aluminum substrate by a galvanic plating technique. The current employed in the galvanic plating technique will determine the speed at which plating occurs and can also be used to control how rough or smooth the metallic corrosion resistant coating will be. For example, galvanic plating at 0.025 A/cm$^2$ will result in a plating speed of about 0.5 μm/min and will result in a uniform depth of application of the metallic corrosion resistant layer. By contrast, galvanic plating at currents greater than 0.025 A/cm$^2$ can result in the production of an uneven depth of application of the metallic corrosion resistant layer. Uniform applications are preferred if the aluminum surface has been deeply etched insofar as the surface of the aluminum is "roughened" and uniform application of the metallic corrosion resistant layer will not alter the resulting roughened surface. Contrarily, uneven application of the metallic corrosion resistant layer is preferred if the aluminum surface has not been deeply etched insofar as the uneven application will provide for a more "roughened" surface thereby enhancing adhesion of the cathode forming material to the current collector. Also, although less preferable than a roughened surface, an adhesion layer of polyacrylic acid, as described in U.S. patent application Ser. No. 07/968,155, now abandoned, and incorporated herein by reference, can be interposed between the current collector and the cathode paste.

Although galvanic plating is the preferred technique for coating the aluminum sheet with the metallic corrosion resistant layer, it will be appreciated that other techniques are also applicable. For example, coating may be achieved alternatively by techniques such as using a polymeric carrier to apply the metal to the aluminum followed by removal of the polymer by volatilization. Whatever technique is employed, it must be one which does not give rise to a corrosion resistant layer having any pinholes because the presence of pinholes could lead to corrosion of the underlying aluminum layer. The thickness of the corrosion resistant layer is selected so as to provided enough of a barrier layer between the aluminum sheet and the rest of the electrochemical cell such that corrosion to the underlying aluminum foil is inhibited. On the other hand, the corrosion resistant layer should be minimized to the extent consistent with its protective effect so as not to appreciably add to the cost and the weight of the electrochemical cell. The corrosion resistant layer has a thickness ranging between about 0.5 and 10 μm, preferably between 0.5 and 3 μm. As compared to conventional nickel current collectors, the current collector of the invention adds less weight to the electrochemical cell and cost less than the corresponding cell using a nickel current collector.

The following examples are given by way of illustration and should in no way be construed as limiting of the subject matter disclosed and claimed.

EXAMPLES

Example 1

The following example illustrates the preparation of a nickel coated aluminum current collector of this invention.

Aluminum foil, preferably an alloy that is identified by either the industry specifications 1235-H19 (99.35% min. Al), or 1145-H19 (99.45% min. Al), and which is available from All Foils, Inc., Brooklyn Heights, Ohio, having a thickness of 25 μm is used in this example. This foil is first degreased using an alkaline galvanic degreasing process. In particular, a strong solution of KCN is applied to the aluminum foil layer by dipping so as to degrease the aluminum foil.

After rinsing off excess alkali with water, the degreased foil is stained by contacting it with a 10–20% solution of sodium hydroxide for between about 40 and 50 seconds. After an additional water rinse, the surface of the foil is treated with 75% nitric acid. After yet another water rinse, the aluminum is stained with zinc using BALSBERG® acidic zinc compound to provide a zinc monolayer on the surface of the aluminum foil.

After another water rinse, the aluminum foil is ready for the application of the nickel layer. This is achieved by galvanic plating of the nickel with a current of approximately 0.025 A/cm$^2$ which provided a plating speed of approximately 0.5 μm/min. The galvanic plating is continued for 2 min. to provide a 1 μm thick layer of nickel overlying a 25 μm thick layer of aluminum foil. The nickel coating has a smooth appearance.

Example 2

This example illustrates the fabrication of an electrochemical cell employing a nickel coated aluminum current collector described above.

A solid electrolytic cell is prepared by first preparing a cathodic slurry which is spread onto a current collector. An electrolyte solution is then placed onto the cathode surface and the cathode slurry and electrolyte solution are simultaneously cured to provide for a solid electrolyte composition. Similarly, an anode composition is placed on a current collector. Thereafter, the anode and cathode are laminated so that the solid electrolyte composition is situated therebetween to provide for a solid electrolytic cell. The specifics of this construction are as follows:

A. The Cathode Current Collector

The cathode current collector employed is a sheet of the above described nickel coated aluminum foil with an adhesion promoter layer attached to the nickel surface of the nickel coated aluminum foil. The adhesion promoter layer contacts the cathode so as to form a composite comprising nickel coated aluminum foil, a cathode and an adhesion promoter layer interposed therebetween. Use of the adhesion promoter layer is optional. The aluminum foil is preferably an alloy that is identified by either the industry specifications 1235-H19 (99.35% min. Al), or 1145-H 19 (99.45% min. Al), and which is available from All Foils, Inc., Brooklyn Heights, Ohio. As referred to in this example, "aluminum foil current collector" is meant to include the nickel coating.

The adhesion promoter layer is prepared as a dispersed colloidal solution in one of two methods. The first preparation of this colloidal solution for this example is as follows:

8.44 parts by weight of carbon powder (Shawinigan Black™— available from Chevron Chemical Company, San Ramon, Calif.)

33.76 parts by weight of a 25 weight percent solution of polyacrylic acid (a reported average molecular weight of about 90,000, commercially available from Aldrich Chemical Company—contains about 84.4 grams polyacrylic acid and 253.2 grams water)

57.80 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 μm. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil about 9 in. (22.86 cm) wide and about 0.0005 in. (0.00127 cm) to about 0.001 in. (0.00254 cm) thick. After application, the solvent is evaporated by placing the mixture/foil into a conventional oven. After evaporation, an electrically-conducting adhesion-promoter layer of about 4–6 μm in thickness is formed. The aluminum foil current collector is then cut to about 8 in. (20.32 cm) wide by removing approximately ½ in. (1.27 cm) from the sides with a conventional slitter so as to remove any uneven edges; the foil can then be further cut to the desired size.

The second preparation of this colloidal solution comprises mixing 25 lbs (11.35 kg) of carbon powder (Shawinigan Black™) with 100 lbs (45.4 kg) of a 25 weight percent solution of polyacrylic acid (average molecular weight of about 240,000, commercially available from BF Goodrich, Cleveland, Ohio, as Good-Rite K702—contains about 25 lbs (11.35 kg) polyacrylic acid and 75 lbs (34.05 kg) water) and with 18.5 lbs (8.399 kg) of isopropanol. Stirring is done in a 30 gallon (113.55 liters) polyethylene drum with a gear-motor mixer (e.g., Lighting Labmaster Mixer, model XJ-43, available from Cole-Parmer Instruments Co., Niles, Ill.) at 720 rpm with two 5 in. (12.7 cm) diameter A310-type propellers mounted on a single shaft. This wets down the carbon and eliminates any further dust problem. The resulting weight of the mixture is 143.5 lbs (65.149 kg) and contains some "lumps."

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 μm with the occasional 12.5 μm particles. The mixture can be stored for well over 1 month without the carbon settling out or reagglomerating.

When this composition is to be used to coat the aluminum foil current collector, an additional 55.5 lbs (25.197 kg) of isopropanol is mixed into the composition working with 5 gallon (18.925 l) batches in a plastic pail using an air powered shaft mixer (Dayton model 42231 available from Granger Supply Co., San Jose, Calif.) with a 4 in. (10.16 cm) diameter Jiffy-Mixer brand impeller (such as an impeller available as Catalog No. G-04541-20 from Cole Parmer Instrument Co., Niles, Ill.). Then, it is gear pumped through a 25 μm cloth filter (e.g., So-Clean Filter Systems, American Felt and Filter Company, Newburgh, N.Y.) and coated as described above.

B. The Cathode

The cathode is prepared from a cathodic slurry which, in turn, is prepared from a cathode powder as follows:

i. Cathode Powder

The cathode powder is prepared by combining 94.1±1.1 weight percent $LiMn_2O_4$ and 5.9±1.1 weight percent of carbon (Shawinigan Black™). About 100 grams of the resulting mixture is placed into a grinding machine (Attritor Model S-1 available from Union Process, Akron, Ohio) and ground for 30 minutes at 150 rpm. Afterwards, the resulting mixture is passed through a 200 mesh screen and then vacuum dried at 60° C. to produce a cathode powder with a water content of less than about 1000 ppm and preferably less than about 300 ppm.

ii. Cathode Slurry

A cathode slurry is prepared by combining sufficient cathode powder to provide for a final product having about 51.7 weight percent $LiMn_2O_4$. The slurry contains the following (in approximate weight percent):

| | |
|---|---:|
| $LiMn_2O_4$ | 51.744% |
| Carbon | 6.456% |
| EPDM (ethylene propylene diene monomer) | 1.8% |
| Xylene | 40.0% |
| | 100% |

The method of preparing 100 grams of the cathode slurry is as follows:

1.8 grams of EPDM (Mooney viscosity of 26±5 and available as VISTALON™ 2504 (Exxon Chemicals Co., Houston, Tex.) are mixed with 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of carbon powder sufficient to provide 51.744 grams of $LiMn_2O_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The above EPDM-xylene solution is passed through 4A molecular sieves and then added to the $LiMn_2O_4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The extruded cathode slurry is then coated to a substantially uniform thickness of about 25–200 μm, more preferably 50–100 μm, and most preferably about 100 μm, over the aluminum foil current collector by a doctor blade, Meyer-rod, or by reverse roll coating. The cathode slurry/current collector is heated to remove the xylene.

C. Electrolyte 36.26 grams of propylene carbonate, 3.45 grams of trimethyl propyl triacrylate, 36.26 grams of ethylene carbonate, and 13.79 grams of urethane acrylate (Actilane SP023, available from Akcros Chemicals, Ltd., Manchester, England) are combined at room temperature until homogeneous. The resulting solution is optionally passed through a column of 4A molecular sieves to remove water and then the recovered solution is mixed at room temperature until homogeneous. If necessary, the ethylene carbonate can first be dissolved in propylene carbonate with heat.

At this point, 1.47 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° and 65° C. with stirring until the film forming agent is dissolved. A thermocouple is placed at the edge of the vortex created by the magnetic stirrer to monitor solution temperature. The solution is cooled to a temperature of less than 48° C. and then 8.77 grams of $LiPF_6$ are added to the solution over a 120 minute period while thoroughly mixing to ensure a substantially uniform temperature profile throughout the solution. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following in approximate weight percent based on the total weight of the electrolyte solution (100 g):

| | |
|---|---|
| Propylene Carbonate | 36.26% |
| Ethylene Carbonate | 36.26% |
| Trimethylol propyl triacrylate (TMPTA) | 3.45% |
| Urethane Acrylate | 13.79% |
| $LiPF_6$ | 8.77% |
| PEO Film Forming Agent | 1.47% |
| Total | 100% |

This solution is then degassed to provide for an electrolyte solution wherein little, if any, of the $LiPF_6$ salt decomposes.

Optionally, the above solution which contains the prepolymer, the film forming agent, the electrolytic solvent and the $LiPF_6$ salt, is filtered to remove any solid particles or gels remaining in the solution. One suitable filter device is a sintered stainless steel screen having a pore size between 1 and 50 μm at 100% efficiency.

In an alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and ethylene carbonate and dry the solution over 4A molecular sieves (Grade 514, 8–12 Mesh from Schoofs Inc., Moraga, Calif.) and then proceed to step 4.

2. Dry the propylene carbonate and ethylene carbonate over 4A molecular sieves (Grade 514, 8–12 Mesh from Schools Inc., Moraga, Calif.).

3. At room temperature, <30° C., add the urethane acrylate to the solvent prepared in step 2. Stir until the resin is completely dissolved. The solution should be clear and colorless.

4. Dry and optionally sift the polyethylene oxide film forming agent through a 25 mesh mini-sieve commercially available as Order No. 57333- 965 from VWR Scientific, San Francisco, Calif. While stirring add the dried and pre-sifted polyethylene oxide film forming agent slowly to the solution. The polyethylene oxide film forming agent should be sifted into the center of the vortex formed by the stirring means at a controlled rate to avoid agglomerate formation. Addition of the polyethylene oxide film forming agent should be dispersive and, during addition, the temperature should be maintained at room temperature (<30° C.).

5. After final addition of the polyethylene oxide film forming agent, stir to ensure that the film forming agent is substantially dispersed.

6. Heat the mixture to 68° to 75° C. and stir until the film forming agent has melted and the solution has become transparent. Optionally, in this step, the mixture is heated to 65° to 68° C.

7. Cool the solution produced in step 6 and when the temperature of the solution reaches 40° C., add the $LiPF_6$ salt very slowly making sure that the maximum temperature does not exceed 55° C. and preferably does not exceed about 40° C.

8. Thereafter, the solution is stirred and degassed. The electrolyte solution is allowed to cool before usage.

9. Optionally, filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is coated by a slot die coater or a reverse roll flexographic coater to a thickness of about 25–50 μm onto the surface of the dried cathode slurry described above.

D. The Anode Current Collector

The anode current collector employed is the above described nickel coated aluminum foil having a layer of adhesion promoter attached to the surface of the foil which will contact the anode so as to form a composite having a sheet of copper foil, an anode and a layer of adhesion promoter interposed therebetween. (Alternatively, copper foil can be used as the anode current collector.)

The same adhesion promoter composition used with the cathode is employed with the anode.

E. The Anode

The anode is prepared from an anodic slurry which, in turn, is prepared from an anode powder as follows:

i. Anode Powder

The anode powder is prepared by combining about 93.81 weight percent of Mitsubishi Gas Carbon™ (a coke-like material) (Mitsubishi Petroleum Co. Ltd, Tokyo, Japan) and about 6.19 weight percent of carbon (Shawinigan Black™). About 100 grams of the resulting mixture is placed into a grinding machine (Attritor Model S-1) and ground for 30 minutes at 150 rpm Afterwards, the resulting mixture is passed through a 200 mesh screen and then vacuum dried at 60° C. to produce an anode powder with a water content of less than about 1000 ppm and preferably less than about 300 ppm.

ii. Anode Slurry

An anode slurry is prepared by combining sufficient anode powder to provide for a final product having about 54.6 weight percent of the Mitsubishi Gas Carbon. The slurry contains the following (in approximate weight percent):

| Mitsubishi Gas Carbon | 54.6% |
| Carbon | 3.6% |
| EPDM (ethylene propylene diene monomer) | 1.8% |
| Xylene | 40.0% |
| | 100% |

The method of preparing 100 grams of the anode slurry is as follows:

1.8 grams of EPDM (VISTALON™ 2504) are mixed in 16.2 grams of xylene to form a 10.0% (wt.) EPDM solution. The temperature is maintained at between 40–45 C as the EPDM is added to the xylene. The solution is preferably filtered through a 20 micron filter cartridge.

An amount of anode powder sufficient to provide 54.6 grams of Mitsubishi Gas Carbon per 100 grams of anode slurry and a sufficient amount of carbon (Shawinigan Black™) to provide 3.6 grams of total carbon per 100 grams of slurry are mixed in a double planetary mixer where the blend is stirred at 7.5 Hz and 25° C. The above EPDM-xylene solution is passed through 4A molecular sieves and then added to the Gas Carbon and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45 ° C. over about a 30 minute period. Finally, the mixture is mixed for 5 minutes at this temperature.

The so-prepared anode slurry can be placed onto the adhesion layer of the aluminum foil current collector by coating a layer of slurry having a substantially uniform thickness of about 25–200 μm, more preferably 50– 100 μm, and most preferably about 50 μm, over the aluminum foil current collector by a doctor blade, Meyer-rod, or by reverse roll coating. The anode slurry/current collector is then heated to remove the xylene.

F. The Solid Electrolytic Cell

A sheet comprising a solid battery is prepared by laminating the anode composite with the electrolyte/cathode composite so that the electrolyte is positioned between the anode and cathode. Lamination is accomplished by minimal pressure.

Although the above example illustrates an electrolytic cell wherein the inventive nickel-coated aluminum foil current collector is present in both the anode and cathode, it is understood that the invention also encompasses embodiments where only the anode or the cathode has the inventive current collector.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A solid electrochemical cell comprising:
   (i) an anode;
   (ii) a cathode;
   (iii) interposed between the anode and cathode, a polymeric electrolyte; and
   (iv) adjacent to either the anode or the cathode, on a side opposite to the polymeric electrolyte, a current collector comprising (a) etched aluminum foil and (b) on a side of the etched aluminum foil facing the cathode or the anode, a layer of a metal which is more resistant to corrosion from components in the electrochemical cell than aluminum in an amount effective to inhibit corrosion between the cathode or anode and the etched aluminum foil.

2. The solid electrochemical cell of claim 1 wherein said metal which is more resistant to corrosion from components in the electrochemical cell than aluminum is selected from the group consisting of nickel, copper, chromium, titanium, and mixtures thereof.

3. The solid electrochemical cell of claim 1 wherein said metal is nickel.

4. The solid electrochemical cell of claim 1 wherein the layer of the metal of said current collector has a thickness ranging between about 0.5 and about 10 μm.

5. The solid electrochemical cell of claim 4 wherein said layer of the metal of said current collector has a thickness ranging between about 0.5 and about 3 μm.

6. The solid electrochemical cell of claim 1 wherein said layer of metal is coated onto said etched aluminum foil by galvanic plating.

7. The solid electrochemical cell of claim 1 wherein said layer of metal has a roughened surface.

8. The solid electrochemical cell of claim 7 wherein the layer of said metal having a roughened surface is obtained by plating whiskers of said metal on said aluminum foil.

9. The solid electrochemical cell of claim 1 wherein the anode is an intercalation based anode comprising carbon.

10. The solid electrochemical cell of claim 1 wherein the cathode comprises materials selected from the group consisting of lithiated cobalt oxides, lithiated manganese oxides, lithiated nickel oxides, and mixtures thereof.

11. The solid electrochemical cell of claim 9 wherein the cathode comprises materials selected from the group consisting of lithiated cobalt oxides, lithiated manganese oxides, lithiated nickel oxides, and mixtures thereof.

12. The solid electrochemical cell of claim 2 wherein the layer of the metal of said current collector has a thickness ranging between about 0.5 and about 10 μm.

13. The solid electrochemical cell of claim 12 wherein said layer of the metal of said current collector has a thickness ranging between about 0.5 and about 3 μm.

14. The solid electrochemical cell of claim 2 wherein said layer of metal is coated onto said etched aluminum foil by galvanic plating.

15. The solid electrochemical cell of claim 2 wherein said layer of metal has a roughened surface.

16. The solid electrochemical cell of claim 15 wherein the layer of said metal having a roughened surface is obtained by plating whiskers of said metal on said aluminum foil.

17. The solid electrochemical cell of claim 2 wherein the anode is an intercalation based anode comprising carbon.

18. The solid electrochemical cell of claim 2 wherein the cathode comprises materials selected from the group consisting of lithiated cobalt oxides, lithiated manganese oxides, lithiated nickel oxides, and mixtures thereof.

19. The solid electrochemical cell of claim 17 wherein the cathode comprises materials selected from the group consisting of lithiated cobalt oxides, lithiated manganese oxides, lithiated nickel oxides, and mixtures thereof.

\* \* \* \* \*